US012779324B2

(12) United States Patent
Olabode et al.

(10) Patent No.: US 12,779,324 B2
(45) Date of Patent: Nov. 3, 2026

(54) AUTO HAPTICS

(71) Applicant: Sony Interactive Entertainment Inc., Tokyo (JP)

(72) Inventors: Richard Olabode, San Mateo, CA (US); Pritpal Panesar, San Mateo, CA (US); Lakshmish Kaushik, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 221 days.

(21) Appl. No.: 18/753,383

(22) Filed: Jun. 25, 2024

(65) Prior Publication Data

US 2025/0387699 A1 Dec. 25, 2025

(51) Int. Cl.

*A63F 13/285* (2014.01)
*A63F 13/424* (2014.01)
*G06F 3/01* (2006.01)

(52) U.S. Cl.

CPC .......... *A63F 13/285* (2014.09); *A63F 13/424* (2014.09); *G06F 3/016* (2013.01)

(58) Field of Classification Search

None

See application file for complete search history.

(56) References Cited

U.S. PATENT DOCUMENTS

2014/0176415 A1* 6/2014 Buuck ...................... G06F 3/016 345/156
2019/0379342 A1* 12/2019 Weber ..................... G06N 3/044
2020/0265864 A1* 8/2020 Markovic ............... G10L 25/18
2021/0090410 A1* 3/2021 Albright .............. G06N 3/0895
2023/0064627 A1* 3/2023 Souviraa-Labastie ........................ A63F 13/79
2024/0293735 A1 9/2024 Henderson et al.

OTHER PUBLICATIONS

International Search Report and Written Opinion in International Appln. No. PCT/US2025/021575, mailed on Jun. 12, 2025, 10 pages.

* cited by examiner

*Primary Examiner* — Jason T Yen
(74) *Attorney, Agent, or Firm* — Fish & Richardson P.C.

(57) ABSTRACT

A machine learning (ML) model is used to automatically generate haptics signals to actuate a haptics generator in a computer game controller. The haptics signal is generated based on audio from the game input to the ML model. Current controller operation and other parameters also may be input to the M model to modify the haptics signal. Category importance and frequency may be applied to the loss function of the ML model to further refine haptics generation. Post-filtering may be used to reduce false positives. Game genre may be used to reduce the number of candidate haptics signals for generation.

20 Claims, 9 Drawing Sheets

Post-Filtering

Weighting

AUTO HAPTICS

FIELD

The present application relates generally to automatically generating haptics for computer simulations such as computer games.

BACKGROUND

People who enjoy computer games often enjoy being immersed in more than one way in the game. For this reason, haptic generators have been introduced into various game components such as computer game controllers.

As understood herein, it would be advantageous to reduce developer workload by automating the generation of haptic signals to actuate haptic generators during game play.

SUMMARY

As further understood herein, automatic haptic generation desirably should account for backwards compatible game titles. However, there is a little if any available research to understand audio-haptics correlations for different applications; comprehensive data from well-designed game haptics is lacking; a limited dataset of difficult to capture haptic generation is confounding; and each game has a different design philosophy so it is difficult to generalize haptic generation to different games.

Accordingly, present principles recognize that an initial step is first determining whether haptic generation for a given game segment should occur, and then responsive to determining that it is appropriate to generate haptics for a segment, generating appropriate haptics for that segment.

Accordingly, an apparatus includes at least one processor system configured to input a first segment of audio from a computer game to a machine learning (ML) model. The processor system is configured to receive from the ML model output representing haptic information, and actuate at least one haptics generator in at least one component based at least in part on the haptic information.

The component on which a tactile signal is generated may be, e.g., a computer game controller, a headset, gloves, foot coverings, a key entry device, a mouse, or other device with one or more haptics generators.

In some embodiments, the processor system may be configured to input to the ML model an indication of operation of a computer game controller aligned in time with the first segment of audio. Thus, play of the haptic information may be based on controller operations.

In example implementations, the first segment of audio can include an audio spectrogram and first and second order deltas representing differences between the first segment of audio and at least a second segment of audio.

In non-limiting embodiments the ML model may be trained to select the haptic information from a database of haptic information based on input of the first segment of audio. In addition or alternatively, the ML model can be trained to output the haptic information based on classifying the first segment of audio. More specifically, the ML model can be trained to classify the audio as being one of: an action sound, an environment sound, a mechanical sound, a sports sound, a computer game character health sound, a vehicle sound, a non-haptic sound.

In certain examples the processor system can be configured to apply weighting to a loss function. The weighting may be based at least in part on importance of audio category and frequency of audio category in a dataset.

In some examples, the processor system can be configured to filter output from the ML model using the first segment of audio and at least two frames of audio neighboring the first segment of audio. In such examples, the processor system can be configured to select category for haptic as non-haptic responsive to non-haptic being a classification in a top "N" samples from the first segment of audio and the two frames of audio neighboring the first segment of audio. If desired, the processor system may be configured to detect input from a computer game controller, and responsive to the input from the computer game controller, classify audio samples as haptics for a period of time from the input. Also, the ML model can be trained to select the haptic information from a database of haptic information based on a genre of the computer game.

In another aspect, a method is disclosed for classifying sequential periods of audio associated with a computer simulation, and for at least a first subset of the periods, not identifying haptics based on the classifying. However, for at least a second subset of the periods, the method includes identifying haptics based on the classifying and outputting tactile signals on at least one device according to the haptics during play of the computer simulation in synchrony with the audio. The device may be, e.g., a computer simulation controller, a headset, gloves, foot coverings, a key entry device, a mouse, or other device with one or more haptics generators.

In another aspect, a device includes at least one computer memory that is not a transitory signal and that in turn includes instructions executable by at least one processor system for classifying plural segments of audio associated with a computer game, and based at least in part on the classifying, identifying respective haptic information for at least some of the respective segments of audio. The instructions are executable for applying the haptics information to at least one haptics generator to generate tactile signals during play of the respective segments of audio.

The details of the present application, both as to its structure and operation, can be best understood in reference to the accompanying drawings, in which like reference numerals refer to like parts, and in which:

DETAILED DESCRIPTION

Figure 1:
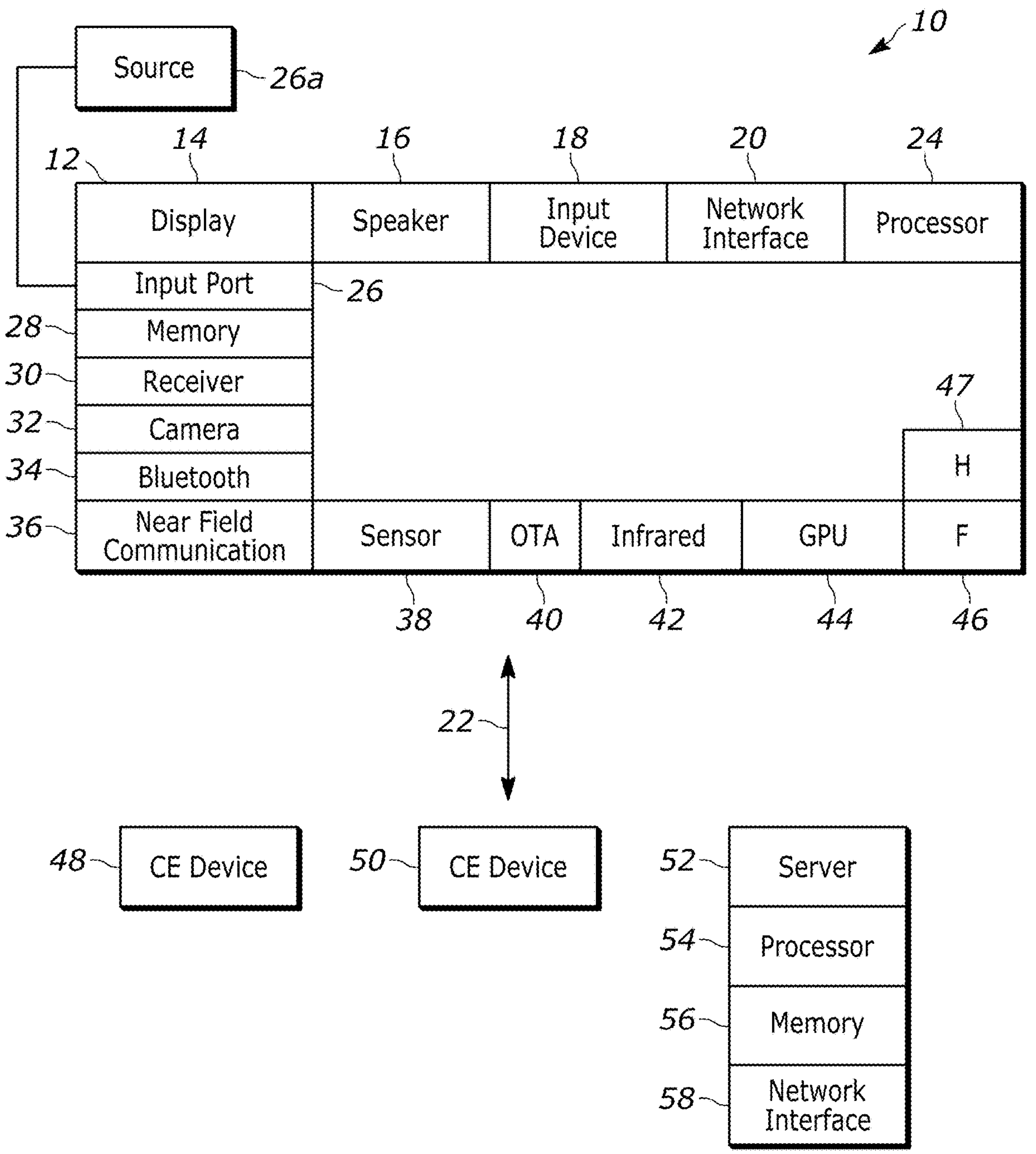
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor system may include one or more processors.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source **26*a* of audio video content. Thus, the source 26*a* may be a separate or integrated set top box, or a satellite receiver. Or the source 26*a* may be a game console or disk player containing content. The source 26*a* when implemented as a game console may include some or all of the components described below in relation to the CE device 48**.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that are configured and weighted to make inferences about an appropriate output.

Figure 2:
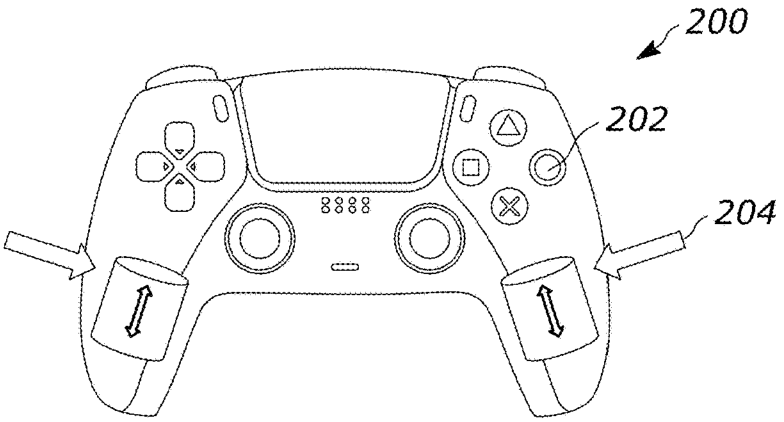
FIG. 2 illustrates an example computer game controller with haptics generators shown schematically.

Refer now to FIG. 2. A computer game controller 200 with various manipulable input elements 202 is shown for controlling play of a computer game. As shown at 204, the controller 200 may include haptics generators such as motors or linear actuators for generating tactile signals that can be felt by a player holding the controller 200. Linear actuators convert electrical actuation signals into vibrations. An example vibration frequency range may be 0 Hz-400 Hz, with lower frequencies (under 100 Hz for example) causing stronger vibrations to mimic explosions or gunshots and with higher frequencies mimicking metallic reverberation, rain, and footsteps.

Figure 3:
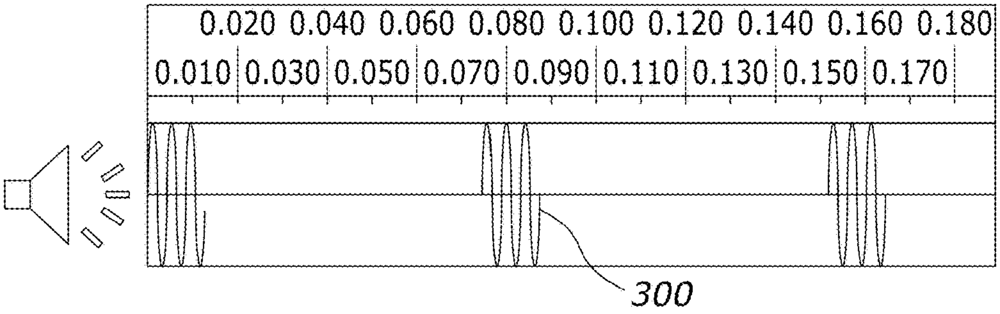
FIGS. 3 and 4 illustrate example waveforms of audio to be input to a ML model to classify the audio and based on the classification, select a haptics output.
Figure 4:
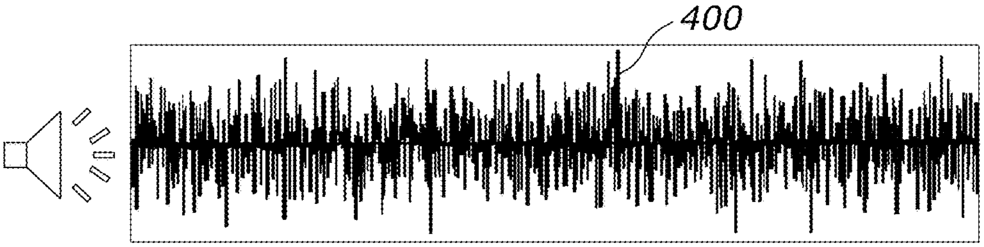

FIG. 3 illustrates an example acoustic waveform 300 representing a machine gun while FIG. 4 represents an acoustic waveform 400 representing wind. As detailed herein, the acoustic waveforms may be converted to spectrograms along with, if desired, first and second order deltas which approximate first and second derivates between adjacent segments (also referred to as windows or frames) of audio, essentially differences between windows, to establish a three-channel input to a machine learning (ML) model for identifying haptics to be associated with the acoustics.

Figure 5:
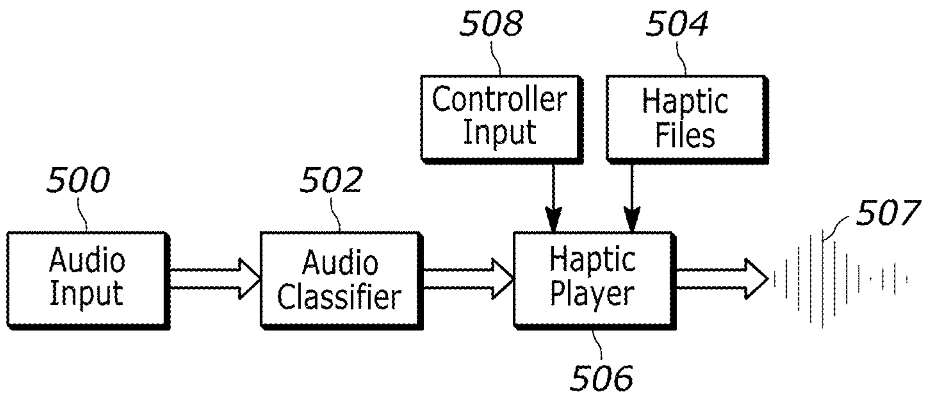
FIG. 5 illustrates an example audio-to-haptics signal processing.

According to present principles and turning to FIG. 5, based on the information 500 (e.g., the above-discussed three-channel input) representing the audio, the audio is classified by a ML-implemented classifier 502 which classifies the input audio to decide which haptic file 504 to use from a database of haptic files to actuate a haptic player 506 to generate a haptics signal 507. Controller input information 508 also may be used in actuating the haptic player 506 as discussed further herein.

Figure 6:
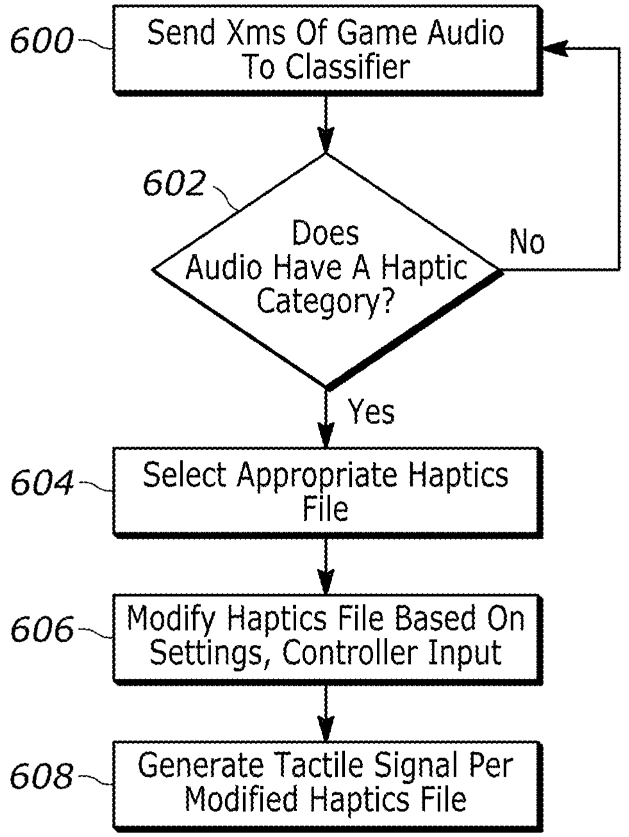
FIG. 6 illustrates example overall logic in example flow chart format.

FIG. 6 illustrates example logic. Commencing at state 600, a window or segment of audio from, e.g., a computer game is sent to the classifier 502 shown in FIG. 5. In one example, "X" may be one hundred milliseconds (100 ms). State 602 indicates that the classifier determines whether the audio segment can be classified into one of the haptics files 502 shown in FIG. 5. If it can be so classified, the logic moves to state 604 to select one of the pre-generated haptics files, which is sent at state 606 to the haptic player 506 shown in FIG. 5. In one example, the haptic player may include a control layer to modify the haptics file based on pre-configured settings and active controller input to generate the haptic signal 507 in FIG. 5, which is sent to, e.g., the controller 200 shown in FIG. 2 to actuate the haptics generator 204.

Figure 7:
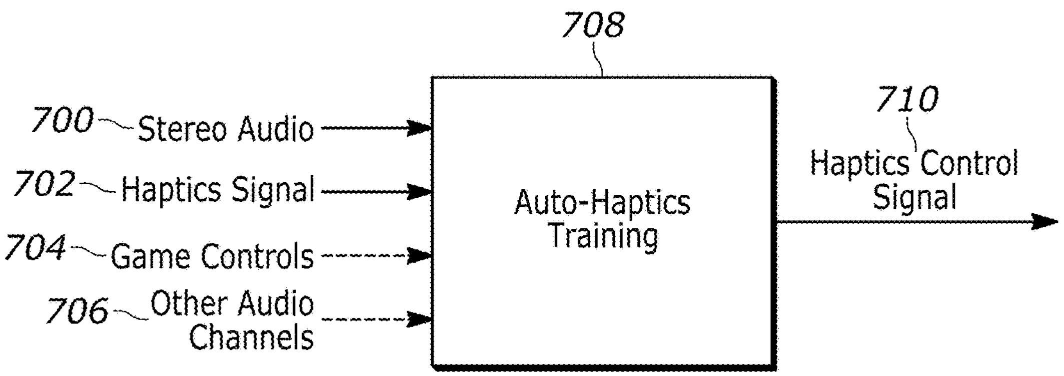
FIGS. 7 and 8 illustrate example signal flow for respective types of computer games.

FIG. 7 represents training the ML model implementing the classifier in FIG. 5 for an example non-limiting PlayStation 5 game title. As shown, all system level inputs are available to the model, including stereo audio channels 700, haptics signals 702, game controller signals 704, and other audio channels 706 for implementing training 708 to generate a haptics control signal 710 based on the inputs.

Figure 8:
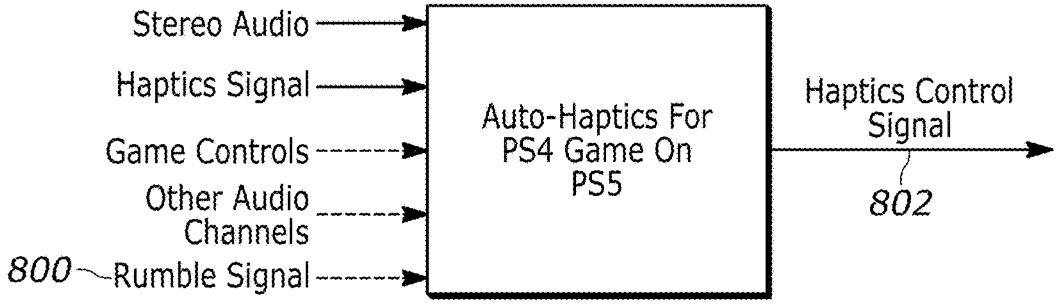

FIG. 8, on the other hand, illustrates an example use case for a PlayStation 4 game running on a PlayStation 5 console. The same system inputs as in FIG. 7 are available in FIG. 8, plus rumble, for generating a haptics control signal 802.

With the above in mind, as understood herein the ML model for classifying audio may require both sufficient quantity and diversity of data across haptic/non-haptics types for training. Data acquisition for training can include a mixture of game titles for different console models, a mixture of game genres (e.g., sports, shooter, racing), and multiple streams of data including audio, control signal input information, and haptics, preferably all time-synchronized. Synthetic data generation also may be used.

Other data used for training may include haptics-backed sound effects and non-haptic sound samples such as music and speech. Within these categories may be action sounds such as gunshots, gun reloads, jumps, melees, footsteps on crunchy surface, footsteps in liquid, footsteps on solid ground; environment sounds such as metal crashing, rocks crashing, glass crashing; mechanical sounds such as doors closing, explosions, and thunder, sports sounds such as balls impacting had and soft surfaces and nets, character status sounds such as sounds related to low health and recovering health, UI status including selecting and scrolling, vehicle-related sounds such as braking, engine revving, gear shifting, horn blowing, and non-haptic sounds.

Figure 9:
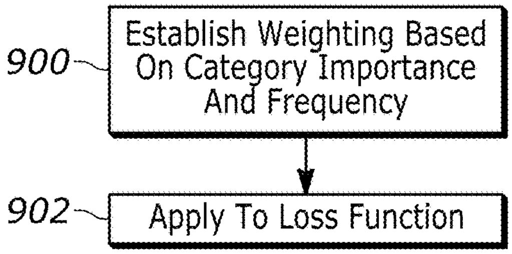
FIG. 9 illustrates example weighting logic in example flow chart format.

Turn now to FIG. 9 for additional details of specific implementations. FIG. 9 indicates that weighting may be used on the ML model. Specifically, as indicated at state 900, to circumvent dataset imbalance issues and to improve non-haptic prediction accuracy to reduce false positives of selecting a haptic file inappropriately (when no haptics should be indicated), weighting may be established at state 900. The weighting may be class weighting based on the importance of each audio category and the frequency that audio category appears across the game audio segments. The weighting is applied at state 902 to the ML model's loss function (e.g., cross entropy) to give more weight to more critical categories. As discussed above, weighting can be based on a combination of audio categorical importance and frequency in the dataset.

Figure 10:
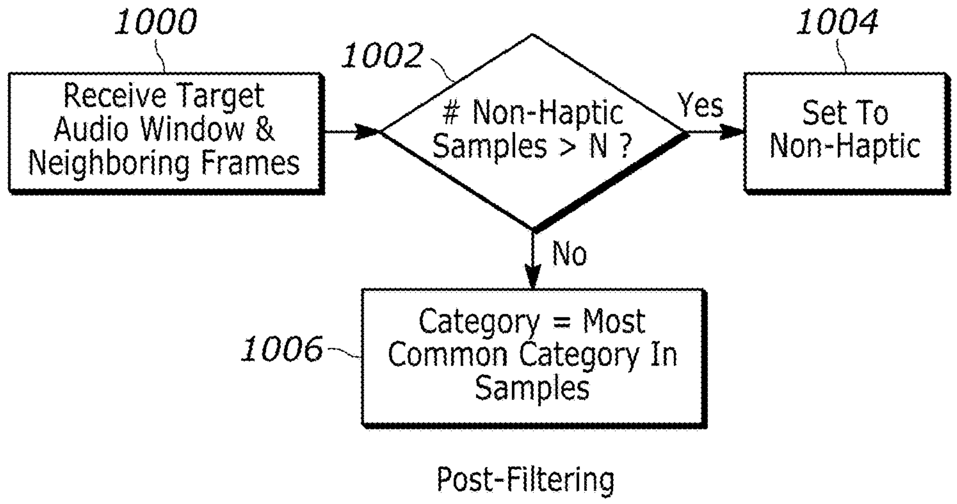
FIG. 10 illustrates example filtering logic in example flow chart format.

FIG. 10 represents a post filtering process in which filters are applied to the model output to reduce false positives and circumvent model 'noise'. Audio frame-grouping statistics can be calculated to determine rules for prediction filtering.

Commencing at state 1000, the target audio segment that is classified for generating haptics is received, along with neighboring frames of audio. In one example, a five-sample window is selected or 500 ms length, which includes a middle three target frames and two neighboring frames respectively before and after the target frames.

Proceeding to state 1002, it is determined whether the number of non-haptic frames in the sample window satisfies a threshold. For example, it may be determined whether the number of non-haptic frames in a sample window of five frame total is greater than three. If the threshold is satisfied, the audio is classified as non-haptic at state 1004, meaning no haptic signal will be generated for that corresponding audio. However, if the threshold is not satisfied at state 1002, the logic moves to state 1006 to categorize the audio as being the most common category within the samples that make up the window under test, with a haptics signal being selected to correspond to this audio classification.

Unlike other methods of reducing model noise and false positives, the technique of FIG. 10 provides unilateral improvement in both recall and precision. Because decisions are made on 100 ms frames, longer range context is beneficial in making more accurate decisions. The technique also smooths out predicted categories due to having neighboring context, and is effective in removing sporadically predicted false positive haptics frames such as speech wrongly picked up as haptic for a 100 ms segment or two.

Figure 11:
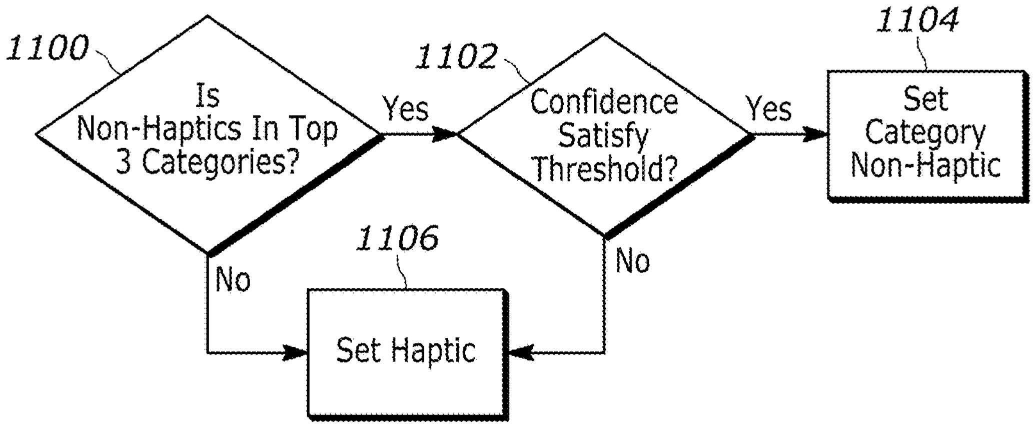
FIG. 11 illustrates example confidence logic in example flow chart format.

Turn now to FIG. 11, which illustrates confidence-based category selection that can circumvent model bias and filter out false positives in lieu of using Soft-Max techniques for selecting a highest-confidence.

Commencing at state 1100, it is determined whether the classification of the audio as being non-haptic is in the top N categories for audio segments for the game under test. In one non-limiting example, N=3. If it is, the logic flow to state 1102 to determine whether confidence satisfies a threshold. In an example, the threshold may be above [80,95]. If the confidence satisfies the threshold, the audio is classified as non-haptic at state 1104. Otherwise, if either test at state 1100 or 1102 is negative, the audio is classified as a haptic category audio at state 1106.

Figure 12:
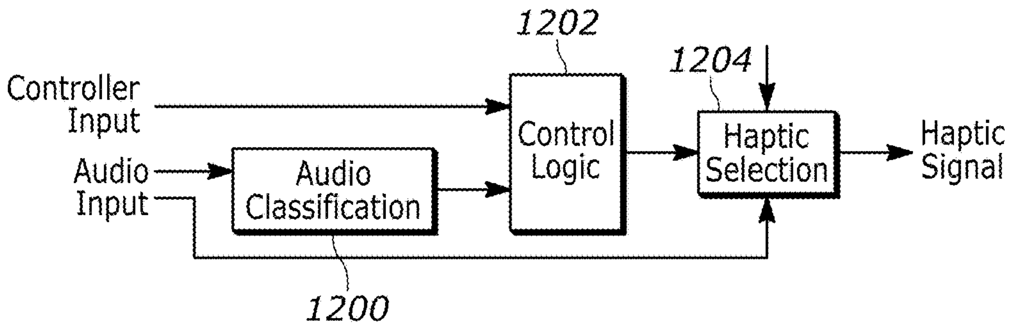
FIG. 12 illustrates example signal processing using audio classification.
Figure 13:
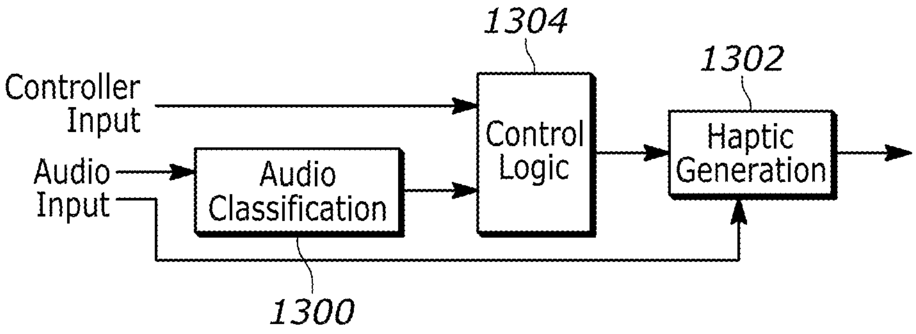
FIG. 13 illustrates example signal processing using haptics classification.

FIGS. 12 and 13 illustrate use of controller input in generating haptics as alluded to previously. In FIG. 12, audio is input to the audio classifier 1200, which sends its output to a control logic block 1202. The control logic block also receives input that includes information as to which button or buttons on the controller are being manipulated concurrently with the audio being played. The output of the control logic block is used for haptic selection 1204, which also receives the input audio along with video if desired to generate the haptics signal.

FIG. 13 illustrates that audio input may be sent to a haptics classifier 1300 and to a haptics generator 1302, which controller input may be sent to control logic 1304, the output of which also is sent to the haptics generator 1302 to generate a haptics signal.

Thus, in FIGS. 12 and 13 controller input is integrated with audio/video to generate the haptics signal. For instance, if a button press is detected, audio samples may be allowed to be classified as haptics normally for the next X period of time, such as for the next 500 ms, 1000 ms or 2000 ms.

The effect of controller input integration may vary depending on the genre of the game from whence the audio is derived and control signal input patterns. Smaller windows allow greater haptics precision by removing false positives.

Moving on from FIGS. 12 and 13, supervised contrastive loss (SCL) may be used to reduce the distance of intra-class embeddings while increasing the distance of inter-class embeddings, leading to better model generalization and performance. As an example, footsteps audio can be pushed closer together but further away from other categories such as gunshots or speech/music (non-haptics) classes. Categories may be used as labels for all samples. A 50-50 loss balance between cross-entropy and SCL may be applied to a SCL model with an additional projection layer instead of focal contrastive loss (FC).

Figure 14:
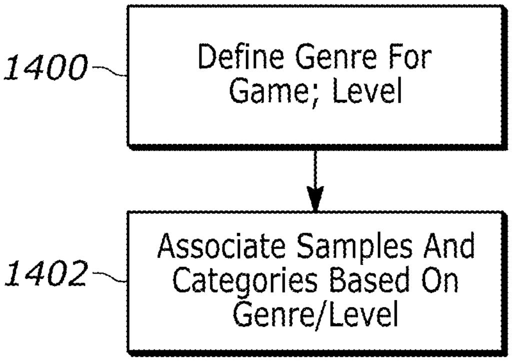
FIG. 14 illustrates example genre-based logic in example flow chart format.

Turn now to FIG. 14 for yet another technique related to present principles, namely, genre conditioning. At state 1400 the genre for the game from whence the audio to be classified for haptics generation is defined. State 1402 indicates that audio samples are associated with audio categories based on the game genre and in some cases based on the level of the game that was played to produce the audio. Game genre (and potentially any other metadata) may thus be used to condition the ML model and reduce model confidence in unrelated categories (and subsequently reducing category confusion) leading to more consistent predictions and higher confidence in relevant categories. Example game genres include action, adventure, racing, shooter, and sports. Non-Haptic samples may be shared by all genres, so genres associated with non-haptic samples may be randomly permutated to associate as many negative samples as possible with all possible genre conditions.

Figure 15:
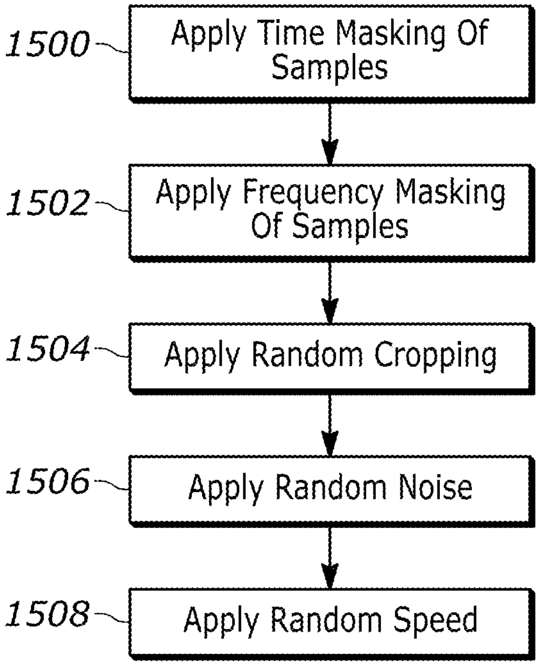
FIG. 15 illustrates example masking logic in example flow chart format.

FIG. 15 illustrates a technique for data augmentation that uses various masking and randomization of audio samples to improve precision and recall in out-of-dataset games. State 1500 indicates that time masking may be implemented on audio samples to be classified, in which 0 to N time bands are randomly masked, with an example N=4. State 1502 indicates that frequency masking may be applied, in which 0 to N frequency bands may be randomly masked, with an example N=10.

Proceeding to state 1504, random cropping may be applied, in which start and end sections of an audio segment may be randomly cropped to fit within the frame window (e.g., to fit within a 100 ms frame window). Also, state 1506 indicates that noise may be randomly applied while state 1508 indicates that speed may be randomly applied.

Figure 16:
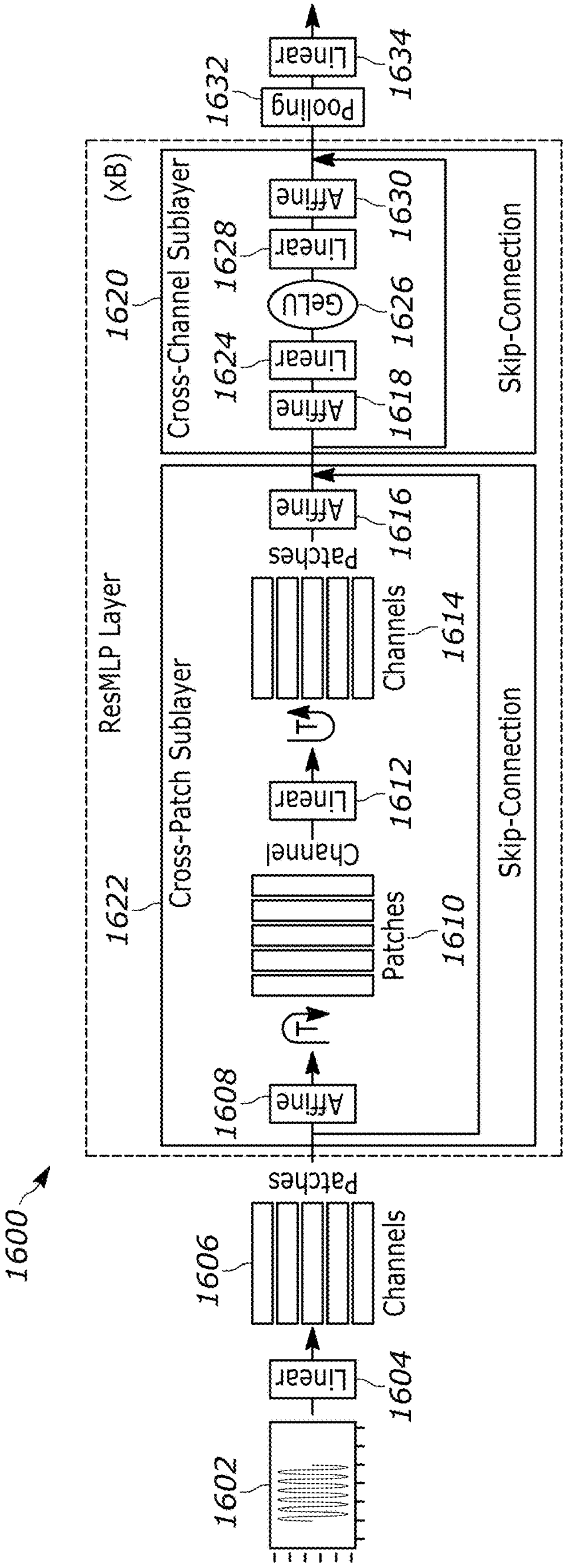
FIG. 16 illustrates an example ML model.

FIG. 16 illustrates an example audio classifier implemented as a residual neural network (ResNet) 1600. An audio sample 1602 is input to a linear block 1604 which divides the audio into channels 1606 for input to an affine layer 1608 in the ResNet 1600. Output of the affine layer 1608 is sent to a patches component 1610, the output of which is sent to another linear block 1612. The linear block 1612 outputs channels 1614 to a second affine layer 1616, which sends its output to an affine layer 1618 in a cross-channel sublayer portion 1620 of the ResNet 1600. Note that the components 1602-1616 in FIG. 16 are part of a cross-patch sublayer 1622 of the ResNet 1600.

The output of the affine layer 1618 in the cross-channel sublayer 1620 is sent to a linear block 1624, and then the data is processed in sequence through a GelU component 1626, a linear block 1628, and a final affine layer 1630 for output to a pooling layer 1632. The output of the pooling layer 1632 is sent to an output linear block 1634 for producing a final output of the ResNet 1600.

The ResNet 1600 in FIG. 16 is a modified version of ResNet-18 with adjusted convolution strides and kernel-sizes along temporal and frequency dimensions to better extract frame-level features. In general, the input may be the above-mentioned three-channel concatenation of a 100 ms spectrogram along with first and second order deltas with an optional label indicating the genre of the game from whence the audio was derived.

Loss may be implemented by a binary cross entropy with optional SCL.

Multiple layers of pross processing may be implemented, starting from median filtering applied to frame-level output to haptic videoplayer selection logic that dictates what haptic category the current frame belongs to based on recent history.

The ResNet 1600 in FIG. 16 is a modified version of ResNet-18 with adjusted convolution strides and kernel-sizes along temporal and frequency dimensions to better extract frame-level features. In general, the input may be the above-mentioned three-channel concatenation of a 100 ms spectrogram along with first and second order deltas with an optional label indicating the genre of the game from whence the audio was derived.

Figure 17:
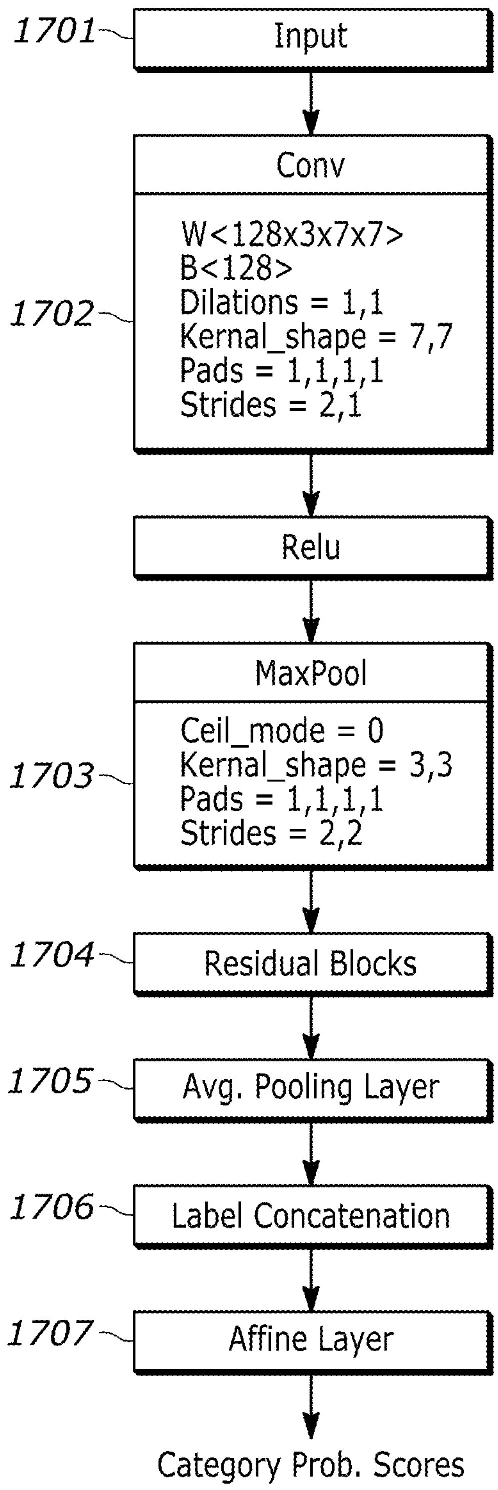
FIG. 17 illustrates an alternate ML model.

FIG. 17 illustrates an alternate example audio classifier implemented as a residual neural network (ResNet) 1700. An audio sample 1701 is input to a convolutional filter 1702 which sends its output to a maximum pooling layer 1703 that downsamples the input using a convolution filter based on the maximum value present with each filter region. Output of the maximum pooling layer 1703 is used as input to a series of repeated residual blocks 1704 with only variations in convolutional filter channel size. The channel size starts from sixty four (64) and scales up by a multiple of two for each series of blocks.

Output of the final residual block is sent to an average pooling layer 1705 that downsamples the input to <1,1, channel_size> with channel size being a multiple of the initial channel size of sixty four (64).

An optional block 1706 is included that allows concatenation of an optional label including genre the game from when the audio was derived. This block is concatenated to the output of the block 1705. The output of this concatenation is used as input to the final affine layer 1707 which generates the probability score of each category.

While the particular embodiments are herein shown and described in detail, it is to be understood that the subject matter which is encompassed by the present invention is limited only by the claims.

What is claimed is:

1. An apparatus comprising:

at least one processor system configured to:

input a first segment of audio from a computer game to a machine learning (ML) model;

receive, from the ML model, output representing haptic information;

determine whether a number of non-haptic frames in the first segment of audio satisfies a threshold;

in response to determining that the number of the non-haptic frames in the first segment of audio does not satisfy the threshold, categorize the first segment of audio as including true haptic information; and in response to categorizing the first segment of audio as including true haptic information, generate instructions for a haptics generator of a controller to cause the controller to vibrate.

2. The apparatus of claim 1, wherein the controller is a computer game controller.

3. The apparatus of claim 1, wherein the processor system is configured to:

input to the ML model an indication of operation of a computer game controller aligned in time with the first segment of audio.

4. The apparatus of claim 1, wherein the first segment of audio comprises an audio spectrogram and first and second order deltas representing differences between the first segment of audio and at least a second segment of audio.

5. The apparatus of claim 1, wherein the ML model is trained to select the haptic information from a database of haptic information based on input of the first segment of audio.

6. The apparatus of claim 1, wherein the ML model is trained to output the haptic information based on classifying the first segment of audio.

7. The apparatus of claim 6, wherein the ML model is trained to classify the audio as being one of: an action sound, an environment sound, a mechanical sound, a sports sound, a computer game character health sound, a vehicle sound, a non-haptic sound.

8. The apparatus of claim 1, wherein the processor system is configured to:

apply weighting to a loss function, the weighting being based at least in part on an importance of audio category and a frequency of audio category in a dataset.

9. The apparatus of claim 1, wherein the processor system is configured to:

filter output from the ML model using the first segment of audio and at least two frames of audio neighboring the first segment of audio.

10. The apparatus of claim 9, wherein the processor system is configured to:

input a second segment of audio from the computer game to the ML model;

receive, from the ML model, second output representing second information; and categorize the second information as non-haptic in response to the second information being classified in a top “N” samples from the second segment of audio and the two frames of audio neighboring the second segment of audio.

11. The apparatus of claim 9, wherein the processor system is configured to:

detect input from a computer game controller; and responsive to the input from the computer game controller, classify audio samples as haptics for a period of time from the input.

12. The apparatus of claim 1, wherein the ML model is trained to select the haptic information from a database of haptic information based on a genre of the computer game.

13. A method, comprising:

inputting a first segment of audio from a computer game to a machine learning (ML) model;

receiving, from the ML model, output representing haptic information;

determining whether a number of non-haptic frames in the first segment of audio satisfies a threshold;

in response to determining that the number of the non-haptic frames in the first segment of audio does not satisfy the threshold, categorizing the first segment of audio as including true haptic information; and in response to categorizing the first segment of audio as including true haptic information, generating instructions for a haptics generator of a controller to cause the controller to vibrate.

14. The method of claim 13, comprising classifying the first segment of audio as comprising at least one of action sounds, environment sounds, mechanical sounds, sports sounds, computer game character health sounds, vehicle sounds, or non-haptic sounds.

15. The method of claim 13, comprising using at least one machine learning (ML) model for executing the categorizing.

16. The method of claim 13, comprising looking up the haptics based at least in part on the categorizing.

17. A device comprising:

at least one computer memory that is not a transitory signal and that comprises instructions executable by at least one processor system for:

inputting a first segment of audio from a computer game to a model;

receiving, from the model, output representing haptic information;

determining whether a number of non-haptic frames in the first segment of audio satisfies a threshold;

in response to determining that the number of the non-haptic frames in the first segment of audio does not satisfy the threshold, categorizing the first segment of audio as including true haptic information; and in response to categorizing the first segment of audio as including true haptic information, generating instructions for a haptics generator of a controller to cause the controller to vibrate.

18. The device of claim 17, wherein the model is a machine learning (ML) model.

19. The device of claim 17, wherein the instructions are executable for inputting to the model an indication of operation of a computer game controller aligned in time with the first one of the segments.

20. The device of claim 17, comprising at least one computer system.

* * * * *